May 4, 1948.  C. E. FISHER  2,441,015
FISH NET
Filed Jan. 12, 1944  3 Sheets-Sheet 1
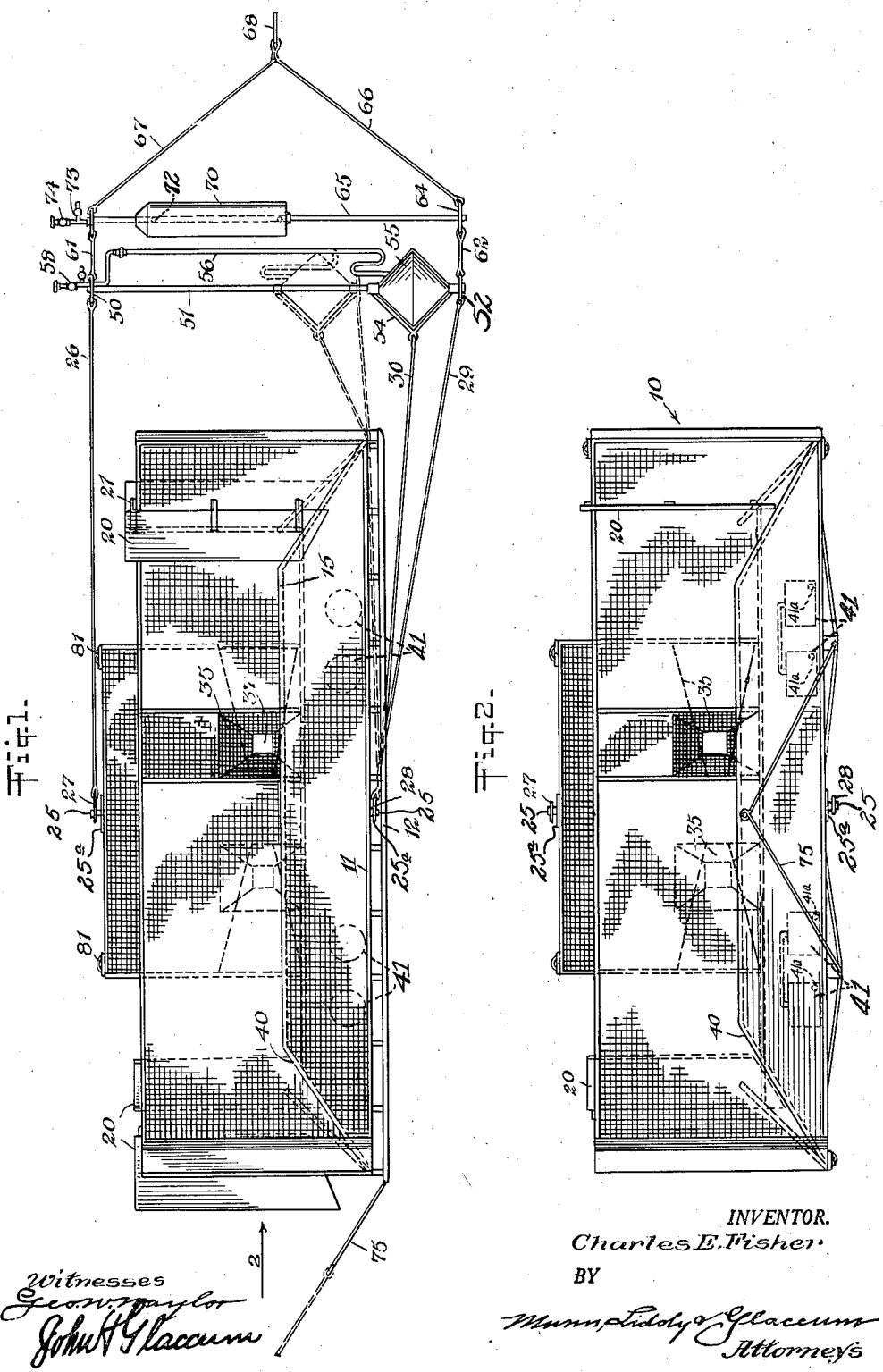
INVENTOR.
Charles E. Fisher
BY
Munn Liddy & Glaccum
Attorneys
Witnesses
Geo. N. Taylor
John H. Glaccum

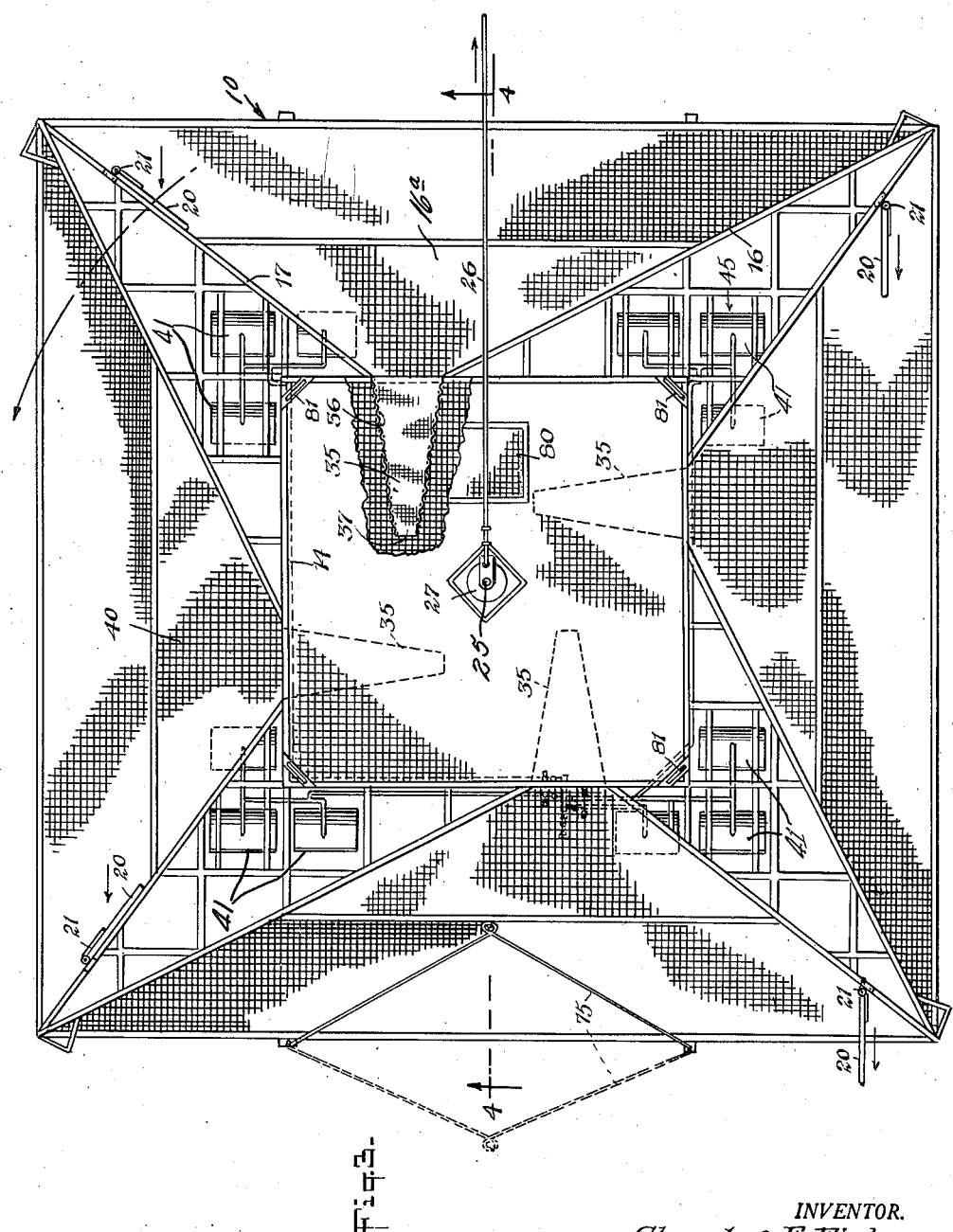

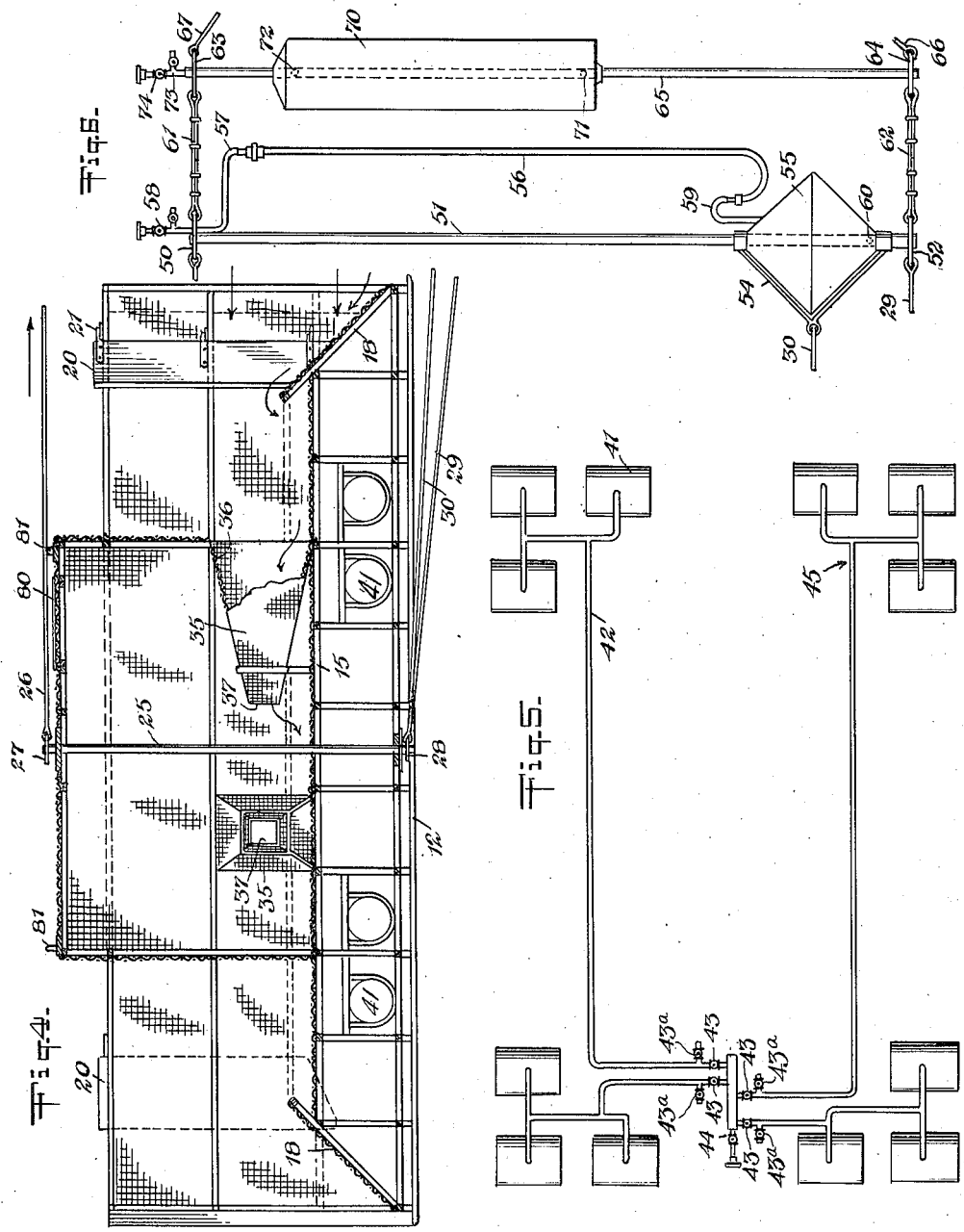

Patented May 4, 1948

2,441,015

UNITED STATES PATENT OFFICE 2,441,015

FISH NET

Charles E. Fisher, Peekskill, N. Y.

Application January 12, 1944, Serial No. 517,913

6 Claims. (Cl. 43—104)

This invention relates to fish nets and more particularly to a rotating net which may be allowed to drift with the tide, be anchored, or towed and which may be used at any desired depth.

It is known fish have certain habits which are universal. When fish meet obstructions in the water they at once sink to deeper water, going nearly to the bottom and swimming along the obstruction. For this reason set or pole nets have long wings or lead-ins going to the bottom and leading to the trap on the deep-water end of the wings. This means the fish must come to the stationary net to be let into the trap. In order to have any considerable catch the wing or lead-ins are often a thousand feet or more in length.

An object of my invention is to provide a net which will be rotated by the tide or current and which will lead the fish directly into the net.

A further object is to provide a net having a floating bottom having wings which will lead the fish upon settling to deeper water into the floating bottom.

Another object is to provide a net which may be towed up onto a beach for repairs or when not in use and which may be readily pulled off the beach and into deeper water.

Still another object of this invention is the provision of a fish net which is adapted to rotate under the influence of the tides or other currents of water. The rotation of the net automatically focuses the openings of the net, or some of them in the direction facing the oncoming flow of water. Such being the case, the fish will more readily be trapped than by means of a stationary net which always faces in a constant direction irrespective of the direction of flow of the currents or tides.

Other objects and advantages will become apparent from the accompanying drawings and the following description.

In the accompanying drawings—

Figure 1 is a side elevation of a net embodying my invention;

Fig. 2 is an end view thereof, as seen from the direction indicated by the arrow marked 2 in Fig. 1;

Fig. 3 is a plan view partly in section;

Fig. 4 is a cross sectional view taken on the line 4—4 of Fig. 3;

Fig. 5 is a plan view of the depth controlling structure;

Fig. 6 is an elevation of the same structure.

I provide a supporting structure or frame 10 which may be made of wood or other suitable material which is preferably rectangular in shape and includes a bottom structure 11 provided with skids 12 and an inner portion 14 having a raised bottom 15. The inner portion 14 is provided with a plurality of leading-in wings, preferably four, each having sides 16 and 17. A sloping floor 18 leads from the bottom of the frame 10 upwardly. The leading-in wings are identical and the sides 16 and 17 of each wing are provided with a net 16a while the side 17 is provided with a hinged plate or vane 20 pivoted at 21 to the frame 10. Frame 10 is provided with bearings 25a in which is disposed a center shaft 25 adapted to allow the frame 10 to rotate about it.

A cable 26 is attached to a bushing 27 at the upper end of the central pole and a second bushing 28 engages the cables 29 and 30 at the bottom of the frame. Each of the wings is provided with an opening or trap 35 shaped like the frustrum of a pyramid having a fair sized opening 36 at one end and a reduced opening 37 at the other; and the entire frame 10 is covered with netting 40. Mounted in the lower portion of the frame, preferably below the floor 15, is a plurality of air tanks 41 connected by pipes 42 to valves 43 in said pipes leading to a main control valve 44. Each set of tanks 45 has a separate valve 43 so that the net may be trimmed to float evenly.

The manner in which this is done is to shut off the valve 43 which is connected to the set of tanks 45 sought to be partially emptied of air. The valve 43a which is located between said valve 43 and the set of tanks 45 under discussion is then opened to the extent necessary to permit sufficient air to escape from said set of tanks 45. Once this is accomplished valve 43a is shut off. When it is again necessary to increase the air content of said set of tanks 45, valve 43 is reopened and air enters said set of tanks through the main valve 44.

The cable 26 is attached to a bushing or ring 50 mounted on a pipe 51 while the cable 29 engages the ring 52 on the opposite end of said pipe. The cable 30 engages the support 54 for the tank 55 which is preferably rectangular and slidably mounted on the pipe 51. The flexible hose 56 leads to the pipe 57 controlled by the valve 58 and engages the nipple 59 leading into the tank 55. The tank 55 is provided with an opening 60 to allow the passage of water and air as will be more fully described. The rings 50 and 52 are connected by the straps 61 and 62 to rings 63 and 64 about the pipe 65. In turn the rings 63 and 64 are engaged by the cables 66 and 67 which engage the tow line 68.

Mounted on the pipe 65 is a tank 70 having an outlet 71 and an inlet 72. A pipe 73 through which air is introduced into tank 70 by way of pipe 65, is controlled by the valve 74. A cable 75 may be attached to the back of the frame for pulling it up onto or off of a beach. Each of the tanks 41 is provided with a small opening 41a to allow the passage of water into each said tank and it will be appreciated that an air hose will run from the attending boat or dock to be connected to the various master or inlet valves. Compressed air delivered through said air hose into said tanks 41 controls the amount of water which is permitted to enter said tanks. When the net is to be towed or allowed to rotate against the tide the air is allowed to escape from the tank 55 and the tank will fill with water through the opening 60 and sink to the bottom of the pipe 51. As the net is towed the vanes 20 will move on their hinges 21. The vanes will quite obviously be controlled by the current. As shown in Figure 3, two of the vanes are held closed against the lead-in wings by the current while the other two vanes are open, that is, away from said wings. This produces greater pressure against the sides of the net where the vanes are closed and will cause it to rotate. As the net rotates, the open vanes are closed and the closed vanes opened by the force of the current, the current or tide thus continuing the rotation.

By controlling the amount of air in the tanks 41, the net may be sunk or raised or trimmed in rough or uneven water. As the net rotates, fish coming in contact with the wing sections will normally sink to deeper water and swim along the sides of the wings 16 and 17 and will thus be led into the opening 36 and into the inner net or trap 14 from which they cannot escape. When the net is filled it may be brought to the surface, by forcing air into the tanks 41, and emptied through the door 80.

If it is desired to beach the net for repairs or to empty it (in order to stop the rotation), air is forced into the tank 55 causing it to move upwardly on the pipe 51 (as shown by dotted lines in Figure 1) and to pull the cable 30 upwardly between the skids 12, thus preventing further rotation. By forcing air into the tank 70 the entire towing apparatus can be raised to clear the beach so that the net may be pulled ashore without injury. By controlling the amount of air in the tank 70 when the net is in use, the proper position of the cables 26, 29 and 30 can be controlled to prevent their fouling. Normally, in beaching the net, it would be towed in by cable 75 so that the cable levelling apparatus would not be injured.

In the upper corner of the nets, members 81 may be provided to insure against fouling of the cables on the corner of the nets.

It will be appreciated that my net may be made of any convenient size and that many variations and modifications may be made without departing from the principles set forth. The drawings show a main valve 44 controlling the flow of air into tanks 41, a main valve 58 controlling the flow of air into tank 55 and a main valve 74 controlling the flow of air into tank 70. These valves may be connected to any suitable source of air under pressure, as for example, a compressed air tank on the boat or a pump for compressing air also situated on the boat. Other alternatives are a portable hand pump or containers of gas under pressure other than air.

I claim:

1. A fishing net comprising a rigid frame, a plurality of wing shaped sections, one on each side of said frame, an inner trap, openings from said wing shaped sections to said inner trap, means for towing said net, and means for rotating said net, said means comprising a plurality of hinged vanes, adapted to be opened and closed by the current.

2. A fishing net comprising a rigid frame, a center shaft in said frame, towing cables on said shaft, means for controlling the position of said towing cables with relation to said frame, and means operated by the tide or current to cause said frame to rotate on said shaft.

3. A fishing net comprising a rigid frame, skids on the bottom of said frame, a central shaft mounted in said frame, towing cables on said central shaft, said frame being divided into a plurality of sections, an inner trap, an opening from each of the sections into said inner trap, a hinged vane on each of said sections to cause said net to rotate with the current, and means for limiting the rotation of said net including air tanks connected to said towing cables whereby the position of said towing cables with relation to said rigid frame and to the skids thereof may be controlled.

4. A fishing net comprising a rigid frame divided into sections, each of said sections having a pair of wings, an inner trap, an opening leading from each of said sections into said inner trap, a central shaft, towing cables communicating with said central shaft, and pivoted vanes on said sections, said vanes being adapted to open and close to cause said net to rotate on said central shaft as it is towed through the water.

5. A fishing net comprising a rigid frame, an inner trap in said frame, wings leading from said inner trap dividing the exterior of said net into a plurality of sections, floors between said wings sloping downwardly, openings from said sections into said inner trap, and means for rotating said trap and for controlling the buoyancy thereof.

6. A fishing net including a rigid frame, an inner trap in said frame, wings leading from said trap dividing the exterior thereof into a plurality of sections, netting on said frame, vanes pivoted to said wing sections, a central shaft in said trap, cables engaging said central shaft, and means for selectively controlling said cables to clear said net to allow said net to rotate when some of said vanes are engaged by a current or to engage said net to prevent its rotation.

CHARLES E. FISHER.

REFERENCES CITED

The following references are of record in the file of this patent:

UNITED STATES PATENTS

| Number | Name | Date |
| --- | --- | --- |
| 492,123 | Tinsley | Feb. 21, 1893 |
| 1,647,027 | Wagner | Oct. 25, 1927 |
| 1,761,365 | Reed | June 3, 1930 |

FOREIGN PATENTS

| Number | Country | Date |
| --- | --- | --- |
| 24,182 | Denmark | June 6, 1917 |